Patented Jan. 6, 1931

1,787,553

UNITED STATES PATENT OFFICE

EMANUEL J. SCHAFFNER, NORA E. SCHAFFNER, AND KATIE EHMCKE FIELD, OF MINNEAPOLIS, MINNESOTA

COMPOSITION OF MATTER FOR USE IN WELDING COPPER AND STEEL

No Drawing.    Application filed April 12, 1930. Serial No. 443,913.

This invention relates to a composition of matter for use in welding copper and steel.

This invention consists of a composition having a new and novel mixture of ingredients as will be hereinafter described and pointed out in the claims, it being understood that changes may be made in the scope of the claims without departing from the spirit of the invention claimed.

In practice it is first necessary to use a mixture of the following ingredients in the proportions stated, namely,

| | Parts by volume |
|---|---|
| Copper | 10 |
| Zinc | 25 |
| Lead | 1¼ |

The foregoing ingredients are melted and mixed. The mixture is allowed to cool and is then ground to a finely comminuted condition.

Two parts of the pulverized preparation are mixed with two parts of borax and one part of copper sulfate.

The iron or steel to which the copper is to be joined is heated to between 1400° F and 1500° F. Borax is applied to prevent oxidation. The area to be treated is then covered with a coating of the composition about $\frac{1}{16}$ inch thick. The temperature of the iron or steel is then increased to about 1900° F. and after about 1½ minutes all signs of the composition will have disappeared. More borax is then applied after which copper at a temperature of approximately 2050° F. is applied either by pouring, dipping or otherwise. Excellent results are obtained by the use of an electric oven.

This composition, when used as explained, can be employed efficiently as a welding flux on any grade of iron or steel whereby copper can be joined thereto or used for plating.

Copper and iron or steel joined as described will be held together securely and the joint will resist excessive compression, tensile and torsional strains.

What is claimed is:

1. A flux for use in joining copper to iron or iron alloys including a material mixed with borax and copper sulfate, said material including copper, zinc and lead mixed while in a molten state and subsequently cooled and reduced to a finely comminuted state.

2. A flux for use in joining copper to iron or iron alloys, including two parts of borax and one part of copper sulfate mixed with two parts of a comminuted preparation consisting of copper, 10 parts, zinc 25 parts and lead 1¼ parts which have been mixed while in a molten state, cooled, and reduced to a comminuted state.

In testimony that we claim the foregoing as our own, we have hereto affixed our signatures.

EMANUEL J. SCHAFFNER.
NORA E. SCHAFFNER.
KATIE EHMCKE FIELD.